United States Patent [19]

Lear et al.

[11] Patent Number: 4,917,835
[45] Date of Patent: Apr. 17, 1990

[54] PROCESS FOR THE PRODUCTION OF POROUS SHAPED ARTICLES

[75] Inventors: Anthony M. Lear, Addlestone; Stephen R. Tennison, Weybridge; Paul W. Satchell, Cardiff, all of United Kingdom

[73] Assignee: The British Petroleum Company p.l.c., London, United Kingdom

[21] Appl. No.: 158,270

[22] PCT Filed: Jul. 22, 1987

[86] PCT No.: PCT/GB87/00524
§ 371 Date: Feb. 4, 1988
§ 102(e) Date: Feb. 4, 1988

[87] PCT Pub. No.: WO88/00601
PCT Pub. Date: Jan. 28, 1988

[30] Foreign Application Priority Data

Jul. 22, 1986 [GB] United Kingdom ............... 8617831

[51] Int. Cl.⁴ ............... B29C 43/00; B29C 67/20; C01B 31/02
[52] U.S. Cl. ............... 264/29.1; 264/126; 264/140; 264/331.12; 264/331.22; 264/DIG. 59; 423/449; 524/386; 524/594
[58] Field of Search ............... 264/28, 29.1, 29.3, 264/29.6, 71, 123, 126, 140, 148, 211, 211.12, 331.12, 331.22, DIG. 59; 241/23; 252/502; 423/449; 524/252, 386, 594; 526/217, 313; 528/137, 145, 146, 162

[56] References Cited

U.S. PATENT DOCUMENTS

| | | | |
|---|---|---|---|
| 2,611,750 | 9/1952 | White | 264/123 X |
| 3,109,712 | 11/1963 | Redfern | 423/449 |
| 3,288,475 | 11/1966 | Hempel et al. | 524/377 |
| 3,574,548 | 4/1971 | Sands et al. | 423/449 |
| 3,626,042 | 12/1971 | Appleby et al. | 264/29.1 |
| 4,076,873 | 2/1978 | Shea | 264/331.22 X |
| 4,137,477 | 1/1979 | Krol et al. | 252/502 X |
| 4,668,496 | 5/1987 | Korb et al. | 423/449 X |

FOREIGN PATENT DOCUMENTS

| | | | |
|---|---|---|---|
| 1471364 | 1/1969 | Fed. Rep. of Germany . | |
| 2623828 | 12/1977 | Fed. Rep. of Germany . | |
| 53-137294 | 11/1978 | Japan | 524/386 |
| 54-10315 | 1/1979 | Japan | 524/386 |
| 54-20991 | 2/1979 | Japan | 423/449 |
| 54-139956 | 10/1979 | Japan | 524/386 |
| 57-74354 | 5/1982 | Japan | 524/386 |
| 1330296 | 9/1973 | United Kingdom . | |

*Primary Examiner*—Jeffrey Thurlow
*Assistant Examiner*—Leo B. Tentoni
*Attorney, Agent, or Firm*—Morgan & Finnegan

[57] ABSTRACT

Porous shaped phenolic resin articles are made by partially curing a phenolic resin to a solid, comminuting the resin, forming into a predetermined shape, and sintering. Porous shaped carbon articles are made by carbonizing the sintered material.

17 Claims, No Drawings

PROCESS FOR THE PRODUCTION OF POROUS SHAPED ARTICLES

The present invention relates to the production of shaped porous resin and carbon articles with improved strength.

Porous phenolic resin articles may be used for example as filters or membrane supports.

Porous carbon articles can be used for:
(a) catalyst supports of various shapes (eg raschig rings),
(b) shaped electrodes for electro-catalysts,
(c) carbon composites
(d) engineering such artefacts (eg crucibles),
(e) high temperature thermal insulators.

GB 1 130 829 discloses the production of carbon articles with a predetermined shape by moulding. Ground coke is mixed with a carbonizable aromatic binder e.g. pitch. The mixture is then formed into the desired shape, the binder is carbonized, and the resulting product further heated. However the pitch used as binder in the above process will tend to fill up the spaces between the coke particles so making the product difficult to carbonize. In addition the internal porosity of the coke particles may become partly filled up by the pitch, leading to low porosity products.

It is well known that activated carbon can be produced in the form of pellets by carbonizing pellets of organic material e.g. wood chips. However the mechanical strength of such pellets is relatively low, even after carbonization at high temperature.

WO 81/03167 discloses the production of a porous carbon by depositing particles of carbonizable polymer in such a way that the particles produce a regularly packed deposit. This is partially degraded to make it form stable, and then heated to carbonized it.

U.S. Pat. No. 4 263 268 shows the preparation of porous carbon from a phenolic resin which is deposited within the pores of an inorganic material. The resin is polymerised within the pores, the inorganic material is removed, and the resin pyrolyzed to form carbon. The resulting carbon is very porous but has a very poor mechanical strength. The fragility of the product is specifically mentioned in the specification.

GB 1 330 296 discloses the formation of carbonized materials from powdered phenolic resins. However the resins are specifically stated to be thermoplastic resins. We have attempted to repeat the process of GB 1 330 296. We have not found it possible to make strong porous articles or articles with shape stability.

We have now found a method of producing porous shaped article having improved strength, with continuous open pore structure.

According to one aspect of the present invention the process for the production of a shaped porous phenolic resin article comprises:
(a) partially curing a phenolic resin mixture to a solid,
(b) comminuting the partially cured resin,
(c) forming the resulting comminuted resin into a pre-determined shape,
(d) sintering the comminuted resin so as to produce a form-stable sintered product,
the temperature and duration of the curing step (a) being so selected as to give a degree of cure sufficient to give a sinterable product.

According to another aspect of the present invention the process for the production of a shaped porous carbon article comprises:
(a) partially curing a phenolic resin mixture to a solid,
(b) comminuting the partially cured resin,
(c) forming the resulting comminuted resin into a pre-determined shape,
(d) sintering the compound resin so as to produce a form-stable sintered product, and
(e) carbonizing the shaped article.
the temperature and duration of the curing step (a) being so selected as to give a degree of cure sufficient to give a sinterable product.

By "sintering" we mean a step which causes the individual particles of phenolic resin to adhere together without the need for a separately introduced binder, while retaining their individual identity to a substantial extent on heating to carbonization temperatures. Thus the particles must not melt after forming so as to produce a molten mass of resin as this would eliminate the internal open porosity of the article. The open porosity (as opposed to the closed cells found in certain types of polymer foams) is believed to be important in enabling formed articles to retain their shape on carbonization.

Phenolic resins are well known materials. They are made by the reaction of a phenol and an aldehyde e.g. formaldehyde. The condensation is initially carried out to produce a partially condensed product. The condensation may be carried out so as to produce a resin which is fully curable on further heating. Alternatively the condensation may be carried out so as to produce a novolak resin which is only curable when an additional cross-linking agent is mixed with it e.g. hexamethylene tetramine (known as "hexamine" or "hex"). It is preferred to use hexamine-cured novolak resins in the process of the present invention.

In order to produce comminuted resin which can be sintered satisfactorily it is necessary to control the temperature and duration of the partial curing step, and the quantity of any cross-linking agent used. If the resin is grossly undercured then no sintering step will be possible because the comminuted particles will melt under the conditions used to form the pre-determined shape. The degree of partial cure may be sufficient that sintering (as defined herein) takes place on directly heating the comminuted resin without any additional additives.

Alternatively the degree of partial cure may be such that sinterable material is obtained after the addition of additional cross-linking agent in a post-curing step. If the resin is overcured it will not be possible to sinter the comminuted particles because they will not adhere together.

The degree of cure of the resin before it is comminuted is critical. The resin must be substantially cross-linked and thus at a higher degree of cure than in the typical commercial phenolic resin moulding powder. If the degree of cure is too low the shaped product formed from the comminuted resin will melt during sintering or carbonization. If however the resin is fully cured then the sintering step cannot be carried out satisfactorily and the final phenolic or carbon product will have very low strengths.

The degree of partial cure is preferably such as to give a certain minimum strength in the shaped article before and after carbonization.

The strength of a sintered article is also dependent on the size of the particles sintered together. Large particles give reduced strength. Thus when evaluating the conditions giving a given degree of partial cure by means of the strength of the resulting article it is desirable to use a standard particle size range. It is preferred to use comminuted resins particles in the size range 100 to 250 micrometers when preparing samples for evaluating degree of cure by means of strength testing.

For instance when producing cylindrical articles on a tabletting machine from comminuted partially cured resin of particle size 106–250 micrometers, the diametric crush strength of the pellets before carbonization preferably does not fall below 0.1 kg/mm and the diametric crush strength of the carbonized pellets preferably does not fall below 0.8 kg/mm.

The diametric crush strength referred to throughout this specification is a normal test within the tabletting industry and expresses the force required to crush a pellet across its diameter as a function of the length of the pellet which is bearing the load.

Two pieces of apparatus have been used. A Manesty Monsanto tablet hardness tester which measures crush forces up to 8.5 kg has been used and an Instron has been used for measuring crush strengths from 1 kg upwards. The method consists of measuring the length of a pellet and then crushing the pellet across its diameter between two perfectly flat metal surfaces. A value in kg/mm is calculated. This is repeated for a number of pellets and a mean value calculated.

For any given resin composition the degree of cure is determined by the curing agent (eg hexamine) content and dispersion and the temperature and duration of the curing step. Thus if 5 to 10% of finely ground hexamine is thoroughly mixed with finely ground resin then the temperature of the partial curing step is preferably below 150° C. If, however, less than 5% hexamine is used then higher temperatures can be used.

The prior art does not teach that the degree of cure is critical in the production of carbonized articles from phenolic resins. However, once the invention has been disclosed to a skilled person as in the present specification, such a person will have no difficulty in carrying out tests to determine the degree of cure by making shaped articles from comminuted resin made with varying degrees of cure. Degree of cure can also be determined by carrying out studies using differential scanning calorimetry. For samples cured to various extents, glass transition temperature increases and the exotherm due to the completion of the cure decreases with increasing extent of cure.

The partial curing step may be conveniently carried out so as to produce slabs of resin which are then comminuted. Conventional grinding machinery may be used to comminute the resin. The resin may be reduced to powder for example with a particle size of less than 500 micrometers, for example 45–250 micrometers. The macropore structure of the final article can be controlled by altering the particle size distribution of the resin at this stage. The use of mixed particle sizes will result in a lower macropore volume. For instance, fine particles of less than 50 micrometers produced by cryogenic grinding could be added to a larger particle size distribution.

The comminuted particles are then formed into shaped articles. This may be done under pressure for example by conventional tabletting or pelleting equipment. Shaped articles may be produced without pressure e.g. by using vibration to ensure that a mould is adequately filled with particles. In addition the resin powder may be moistened with a suitable liquid (for example water) to enable extrusion to be carried out or to allow pressing into shapes. Examples of pressures which may be applied in such a forming step are 0 to 800 MPa.

The macropore structure can also be controlled by adjusting the sintering pressure and temperature. The use of high pressures and hot pressing techniques will reduce macro pore volume. It is generally desirable to add a lubricant when using tabletting or extrusion equipment. The use of such lubricants is conventional in tabletting and extrusion technology. However, careful selection of lubricant is desirable to avoid adverse effects on the strength of the formed articles. It has been found that pellets made using stearic acid as lubricant are substantially weakened, whereas the use of polyethylene glycol as lubricant has no effect on pellet strength.

When the amount of curing agent (eg hexamine) used in the initial partial cure step is insufficient for complete cure, further curing agent can be added prior to the forming stage. After forming the shaped article may be subjected to a post-curing step in which it is heated at temperatures of for example 120° to 170° C., to complete the sintering.

The sintering step of the present invention may be carried out by applying heat to the phenolic resin particles, by applying pressure, or by a combination of both.

The addition of curing agent at the forming stage enables less curing agent to be added at the partial curing stage. This makes control of the initial partial curing easier. The sintering and forming steps may be combined when the forming step is carried out at sufficiently high pressures. For forming steps carried out at pressures below 50 MPa at normal ambient temperatures (e.g. 10°–30° C.) it will be necessary to carry out a subsequent heating (or post-cure) step to achieve the necessary sintering and it will be preferable to add additional curing agent at the forming step.

The carbonization is carried out by heating the shaped articles at temperatures above 600° C. The duration of the heating step may be for example 1 to 48 hours. The carbonization step is carried out under an inert atmosphere or in a vacuum in order to avoid combustion of the carbon.

When making carbonized articles it is possible to carry out sintering and then carbonization in a single heating step. However it is possible to use relatively simple equipment for the sintering step, while it may be desirable to use more complex apparatus e.g. rotary furnaces for carbonization. The sintering step enables a product to be obtained, using relatively simple apparatus, which is sufficiently strong to enable it to withstand the forces imposed on it by such rotary ovens.

The carbonization step produces a reduction in the overall dimensions of the formed article being carbonized. This reduction is substantial at higher temperatures (i.e. greater than 700° C.). Nevertheless we have found it possible to produce carbonized articles which accurately reproduce the shape of a mould, even though the final dimensions of the article are considerably smaller than those of the mould.

An advantage of the present invention is that high heating rates can be used for carbonization while maintaining a controlled open porosity.

The invention will now be described by reference to the following experiments, in which comparative tests, not according to the invention, are identified by letters, and Examples of the invention are identified by numbers.

The phenolic resin used in Examples 1-12 was a phenol-formaldehyde novolak resin supplied by BP Chemicals under the designation J1011/H which contains 10% hexamine by weight and is in finely ground form 98% at less than 75 micrometers. Lower percentages of hexamine were obtained by adding a phenol-formaldehyde novolak resin supplied by BP Chemicals under the designation J1010 which consists of ground resin alone.

COMPARATIVE TEST A

This Comparative Test, not according to the invention, shows which happens when an attempt is made to make a shaped article by directly casting the article from a phenolic resin and then attempting to carbonize the article directly without grinding and compacting. Direct casting of the article might seem the obvious method of producing an article with controlled shape.

Cylindrical dies 12 mm in diameter and 20 mm deep were filled with the curable powder composition of resin and 10% hexamine (J1011/H). The cylindrical blocks of resin were cured in the dies for 2.5 hours at 150° C. After curing they were removed from the dies and carbonized by heating to 880° C. at a rate of 3.3 C/min and holding for 1.2 hours. The resulting objects were mishapen and contained large cavities.

COMPARATIVE TEST B

This comparative test, not according to the invention, shows what happens when an attempt is made to make a shaped article from an uncured resin hexamine powder mixture. The curable composition was used as in Test A. 10% stearic acid was added and the powder was formed into 3/16" (4.8 mm) diameter pellets using a pressure of 550 MPa. These pellets were carbonized by heating to 800° C. at a rate of 5° C./min. The pellets were found to have flowed together into a solid mass during carbonization.

COMPARATIVE TEST C

This comparative test, not according to the invention, shows what happens when an attempt is made to make a shaped article from a highly cured resin hexamine mixture. A 5% hexamine in resin mixture was prepared by mixing equal parts of J1011/H and J1010. This powder was placed in a tray and cured for 8 hours at 150° C. The resulting solid was comminuted and the powder fraction less than 106 micrometers was taken. This was formed into pellets as in Test B. These pellets had a mean diametric crush strength of 0.22 kg/mm. Postcure of the green pellets gave a diametric crush strength of 0.03 kg/mm. The pellets were carbonized as in Test B. After carbonization the pellets had a mean diametric crush strength of 0.22 kg/mm showing that sintering in accordance with the invention had not taken place.

EXAMPLE 1

Cylindrical blocks of resin were prepared of the same size and shape as in comparative test A but with the following differences. Resin J1011/H was poured into trays and cured for 2.5 hours at 150° C. The resulting slabs of substantially but not completely cured resin were ground using a hammer mill to give particles with a size of 106-250 micrometers. The powdered resin was then mixed with 8% by weight of polyethylene glycol based on a total weight of composition to be pelleted and then formed into pellets in a hand press. The pressure applied was 260 MPa.

The resulting pellets were subjected to a postcuring step to sinter them by heating in an oven at 150° C. for 1 hour. The postcured pellets were then carbonized by heating to 900° C. at 5° C./min. Although smaller in size the pellets were perfect cylinders and contained no large cavities when sectioned.

EXAMPLES 2, 3, 4

Experiments were carried out as in Comparative Test C but with the initial cure conditions being 120° C. for 2, 4 and 8 hours respectively the results are given in Table 1. Crush strength of the green pellets decreases with increasing cure time.

EXAMPLES 5, 6, 7

Experiments were carried out as in Examples 2, 3 and 4 except that the resin was ground to a particle size of 106-250 micrometers. The results are given in Table 2. Crush strength of the green pellets decreases with increasing cure time.

EXAMPLES 8-12

These were carried out as in Examples 5-7 but with the initial cure, and post cure and carbonization conditions as shown in Table 3. The results of crush strength measurements are shown in Table 3. In all cases sintering took place on pelleting and post curing sufficient to give strong porous carbon pellets after carbonization. In the case of Examples 10 and 12 (in which stearic acid was used as lubricant) the strength of the resulting carbonized pellet was less than that obtained under the same conditions but using PEG as a pelleting lubricant.

COMPARATIVE TEST D AND E

This was carried out in the same way as Examples 9 and 10 except that a 10% hexamine was used at the partial cure stage. The conditions used are shown in Table 3. It was not possible to prepare pellets in these experiments because of overcure of the phenolic resin in the initial cure stage.

EXAMPLE 13

An experiment was carried out as in Tests D and E except that the phenolic resin used was a phenol-formaldehyde novolak resin not containing hexamine curing agent and sold by BP Chemicals Ltd under the identification J 1009/W. This was coarsely ground on the small scale (to less than 250 micrometers). Hexamine particles were mixed in with the resin before the initial curing stage. The conditions used and the results obtained are shown in Table 3. In this Example the extent of the initial cure has been controlled by the larger particle size and hence poorer dispersion of resin and hexamine. Regrinding of the partially cured material has produced a powder capable of sintering under pressure to give strong pellets. These pellets have further sintered during the post cure step to give a very strong material.

EXAMPLE 14

Finely ground phenolic resin containing 2.5-3.0% hexamine and sold by BP Chemicals under the identification J 11011/1 was cured for 2 hours at 150° C. The resulting solid was ground to less than 106 micrometers. A mixture suitable for extrusion was prepared as follows:
  2227 g—resin as prepared above
  180 g—hexamine 240 g—poly ethylene glycol dissolved in 888 g water This mixture was blended in a Z-blade mixer for 10 minutes. The resulting material was extruded using a Russel Finex extruder, model EXDS-100. This material was dried in a fluid bed drier. The extrudate had a mean crush strength of 2.7 kg/mm. The material was carbonized in nitrogen at 5° C./min to 900° C. and held for 2 hours. The mean crush strength of the carbonized material was 1.9 kg/mm.

EXAMPLE 15

Phenolic resin containing 2.5–3.0% hexamine (J 11011/1) was cured for 2 hours at 150° C. The resulting solid was ground to 106–250. To 200 g of this powder was added 18 g polyethylene glycol dissolved in 70 g of water. This blend was pressed in a die of diameter 30 mm at a pressure of 14 MPa to produce a disc of thickness of 2 mm. This was removed from the die. A number of discs could therefore be readily made. The discs were post-cured at 150° C. for 1 hour. Strong porous resin discs were thus manufactured. Some of the discs were carbonized by heating in nitrogen to 900° C. at 5° C./min and holding for 30 minutes. Strong porous carbon discs were produced of diameter 24 mm.

EXAMPLE 16

Phenolic resin containing 2.5–3.0% hexamine (J 11011/1) was cured for 2 hours at 150° C. The resulting solid was ground to 106–250 micrometers. The resin powder was poured into a glass tube of internal diameter 25 mm and vibrated to ensure good packing. The tube and contents were postcured at 150° C. for 1 hour. The glass tube was then removed leaving a strong porous resin rod. This was carbonized as in Example 15. A strong porous carbon rod was produced of diameter 19 mm.

TABLE 1

| 5% hexamine cure temp. 120° C. Ground to less than 106 micrometers. Stearic acid lubricant. | | | |
|---|---|---|---|
| Example | 2 | 3 | 4 |
| Cure time (hours) | 2 | 4 | 8 |
| Diametric crush strengths (kg/mm) | | | |
| "Green" Pellets | 0.76 | 0.42 | 0.18 |
| Postcured | * | 0.55 | 0.36 |
| Carbonized | * | 1.86 | 1.92 |

TABLE 2

| As Examples 2-4 but with particle size 106–250 micrometers | | | |
|---|---|---|---|
| Example | 5 | 6 | 7 |
| Cure time (hours) | 2 | 4 | 8 |
| Diametric crush strength (kg/mm) | | | |
| "Green" pellets | 0.41 | 0.33 | 0.18 |
| Postcured | — | 0.48 | — |
| Carbonized | — | — | — |

In the above tables * indicates that the crush strength has above 2 kg/mm.

TABLE 3

| Experiment Resin | Initial Cure | | | Pelleting Additives | Postcure | Carbonization | Crush Strength Diameter kg/mm | | |
|---|---|---|---|---|---|---|---|---|---|
| | % Hexamine | Temperature °C. | Time Hours | | | | Raw | Postcured | Carbonized |
| 8 | 2 | 150 | 4 | 8% Hexamine 10% PEG | 170° C. 2 hrs | 800° C. 10° C./min | 1.21 | 12.90 | 8.25 |
| 9 | 4 | 150 | 4 | 6% HEX 10% PEG | 150° C. 1 hr | 900° C. 10°/min | 0.77 | 8.24 | 7.23 |
| 10 | 4 | 150 | 4 | 6% HEX 10% Stearic Acid | 150° C. 1 hr | 900° C. 10°/min | 0.23 | 2.51 | 2.38 |
| D,E | 10 | 150 | 4 | (D) 10% PEG or (E) 10% Stearic | | | | | |
| 11 | 10 | 120 | 4 | 10% PEG | 150° C. 1 hr | 900° C. 10° C./min | 1.11 | 1.96 | 2.55 |
| 12 | 10 | 120 | 4 | 10% Stearic Acid | 150° C. 1 hr | 900° C. 10° C./min | 0.52 | 0.59 | 0.85 |
| 13 | 10 | 150 | 4 | 10% PEG | 150° C. 1 hr | 900° C. 10° C./min | 1.18 | 12.99 | 5.89 |

We claim:

1. A process for the production of a shaped porous phenolic resin article which comprises:
   (a) partially curing a phenolic resin mixture to a solid form,
   (b) grinding the solid to form particles,
   (c) forming the resulting ground solid into a predetermined shape,
   (d) sintering the shaped solid so as to produce a form-stable sintered product,
   the temperature and duration of the partial curing step (a) being so selected as to give a degree of cure sufficient to give a sinterable product in step (d).

2. A process for the production of a shaped porous carbon article comprising:
   (a) partially curing a phenolic resin mixture to a solid form,
   (b) comminuting the partially cured solid to form particles,
   (c) forming the resulting ground solid into a predetermined shape,
   (d) sintering the shaped solid so as to produce a form-stable sintered product, and
   (e) carbonizing the shaped article, the temperature and duration of the partial curing step (a) being so selected as to give a degree of partial cure sufficient to give a sinterable product in step (d).

3. A process according to claim 1 or 2 wherein the temperature and duration of the curing step are selected such that when a pellet is produced from comminuted resin of particle size 106–250 micrometers in a tabletting machine its diametric crush strength is not less than 0.1 kg/mm.

4. A process according to claim 2 wherein the temperature and duration of the curing step are selected such that when a pellet is produced from a ground resin of particle size 106–250 micrometers in a tabletting machine and is carbonized, its diametric crush strength is not less than 0.8 kg/mm.

5. A process according to either of claims 1 or 2 wherein the degree of partial cure resulting from the partial curing step is sufficient to allow sintering of the ground phenolic resin particles without addition of cross-linking agent to the comminuted phenolic resin particles.

6. A process according to claim 1 or 2 wherein the phenolic resin is a phenol-formaldehyde resin.

7. A process according to claim 6 wherein the resin is a novolak resin.

8. A process according to claim 7 wherein the novolak resin is a hexamine-cured novolak resin.

9. A process according to claim 8 wherein 5 to 10% of finely ground hexamine is mixed with finely ground novolak resin and the partial curing step on the resulting mixture is carried out at below 150° C.

10. The process according to claim 1 or 2 wherein the partially cured resin is ground to a particle size less than 500 micrometers.

11. The process according to claim 1 or 2 wherein the shaped article is formed by application of a pressure below 800 MPa.

12. The process according to claim 1 or 2 wherein the shaped article is formed without the application of pressure.

13. The process according to claim 1 or 2 wherein polyethylene glycol is added to the phenolic resin before the forming step.

14. A process according to claim 1 or 2 wherein additional curing agent is mixed with the ground phenolic resin particles subjected to the forming step.

15. A process according to claim 1 or 2 wherein the shaped article resulting from the forming step is heated to 120° to 170° C. to complete the sintering.

16. A process according to claim 2 wherein the shaped article is carbonized at temperatures above 600° C.

17. A process according to claim 16 wherein the duration of the carbonization step is 1 to 48 hours.

* * * * *

UNITED STATES PATENT AND TRADEMARK OFFICE
CERTIFICATE OF CORRECTION

PATENT NO. : 4,917,835

DATED : April 17, 1990

INVENTOR(S) : Anthony M. Lear; Stephen R. Tennison and Paul W. Satchell

It is certified that error appears in the above-identified patent and that said Letters Patent is hereby corrected as shown below:

Column 8, line 49:
Claim 2, line 5, "comminuting" should read --grinding--.
Column 9, line 7:
Claim 5, line 5, "comminuted" should read --ground--.

Signed and Sealed this

Twenty-fourth Day of December, 1991

Attest:

HARRY F. MANBECK, JR.

Attesting Officer     Commissioner of Patents and Trademarks